June 13, 1950 W. H. BAKER 2,510,947
SUPERSONIC RADAR TRAINER SIGNAL REFLECTING
PRISM AND ALTITUDE RING SUPPRESSOR
Filed Aug. 18, 1947 2 Sheets-Sheet 1

INVENTOR.
WILLIAM H. BAKER
BY Wade Koontz AND
Orlando N. Molloy
ATTORNEYS

June 13, 1950
W. H. BAKER
2,510,947
SUPERSONIC RADAR TRAINER SIGNAL REFLECTING
PRISM AND ALTITUDE RING SUPPRESSOR
Filed Aug. 18, 1947
2 Sheets-Sheet 2
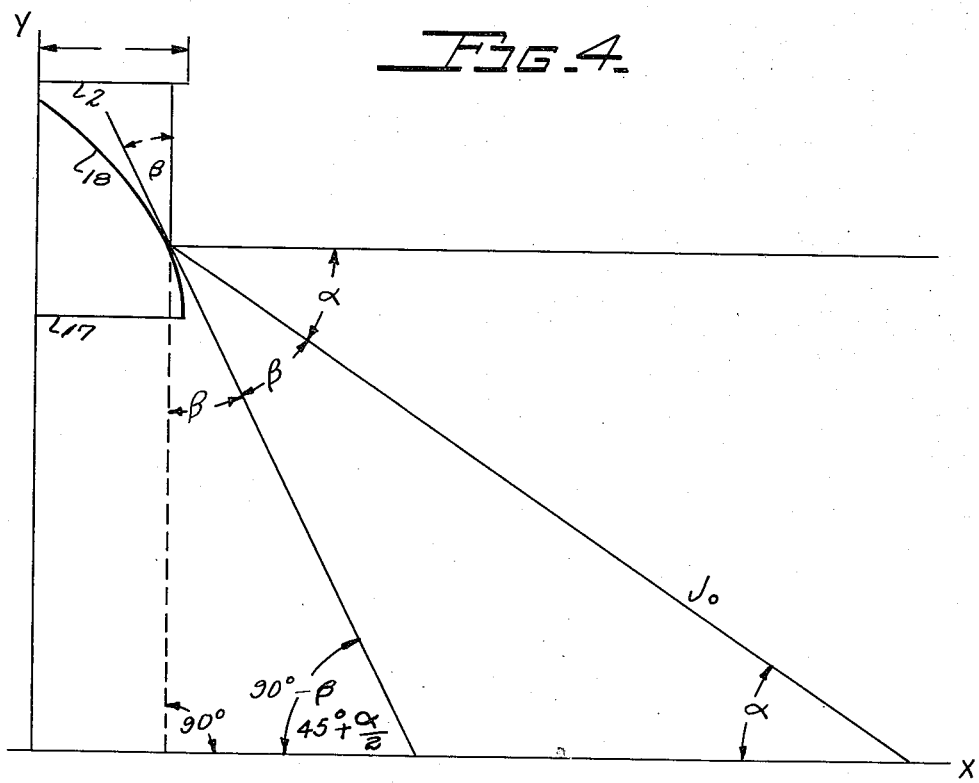
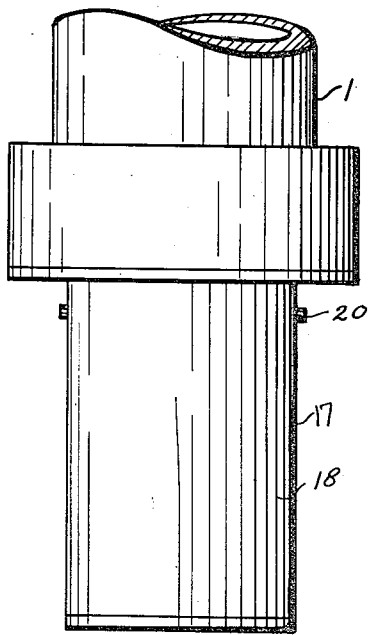
INVENTOR.
WILLIAM H. BAKER
BY Wade Koontz AND
Orlando M. McCoy
ATTORNEYS Patented June 13, 1950

2,510,947

UNITED STATES PATENT OFFICE 2,510,947

SUPERSONIC RADAR TRAINER SIGNAL REFLECTING PRISM AND ALTITUDE RING SUPPRESSOR

William H. Baker, Dayton, Ohio

Application August 18, 1947, Serial No. 769,285

3 Claims. (Cl. 35—10.4)

(Granted under the act of March 3, 1883, as amended April 30, 1928; 370 O. G. 757)

The invention described herein may be manufactured and used by or for the Government for governmental purposes without payment to me of any royalty thereon.

This invention relates to radar equipment and more particularly to a modified radar training equipment inclusive of a particular prism for use as a part thereof and inclusive of means for minimizing altitude ring phenomena from equipment presentations.

In training students in radar operations and presentations, a ground training equipment simulating field radar operations is commonly used. In the form of such equipment to which the present invention pertains, a radar antenna assembly is simulated by a trolley mounted rotatable pipe closed at its lower end by a quartz crystal and carrying a signal reflecting prism suspended below the lower end of the pipe. The lower end of the pipe and the prism are immersed in a tank of water. Radar synchronizing signal from a usual radar set is modified and applied to the quartz crystal. These signals set up sound waves in the water that simulate both the signal presentation and the echo thereof upon the screen of a cathode ray tube part of the radar set. The prism immersed in the water and spaced from the lower end of the pipe reflects both the signal from the quartz crystal and the signal echo returned to the quartz crystal from the bottom of the tank upon which a contour map may be disposed, if preferred.

Presentations in such equipment have been characterized heretofore by altitude rings that appear upon a PPI presentation as a series of concentric circles appearing upon the radar scope or screen of a cathode ray tube. These rings are objectionable since they occur in the vicinity of the bomb release marker spaced by the distance between the sound generator or crystal in the lower end of the pipe and the bottom of the tank or relief map.

The present invention comprises essentially a prism having a signal reflecting face of a predetermined configuration for optimum signal and echo reflection in combination with sound absorbent pads secured upon horizontally disposed parts of the assembly that are positioned to intercept echo signals from the bottom of the tank and that serve to substantially eliminate or to minimize altitude rings as spurious signal presentations.

An object of the present invention is to provide improved radar training equipment of increased similarity to field equipment and characterized by presentations that are substantially free from altitude ring interference.

Another object is to provide a signal reflecting prism for the designated equipment that has an optimum reflecting face of mathematically determined configuration.

A further object is to provide means in the designated equipment for suppressing altitude rings.

With the above and other objects in view which will be apparent from the following description, an illustrative apparatus embodying the present invention is shown in the accompanying drawings wherein:

Fig. 2 is an elevational view of the assembly shown in Fig. 1 taken from the right side thereof;

Fig. 4 is a graph illustrating the derivation of the signal reflecting face of a prism that is a part of the assembly shown in Fig. 1.

Figure 1:
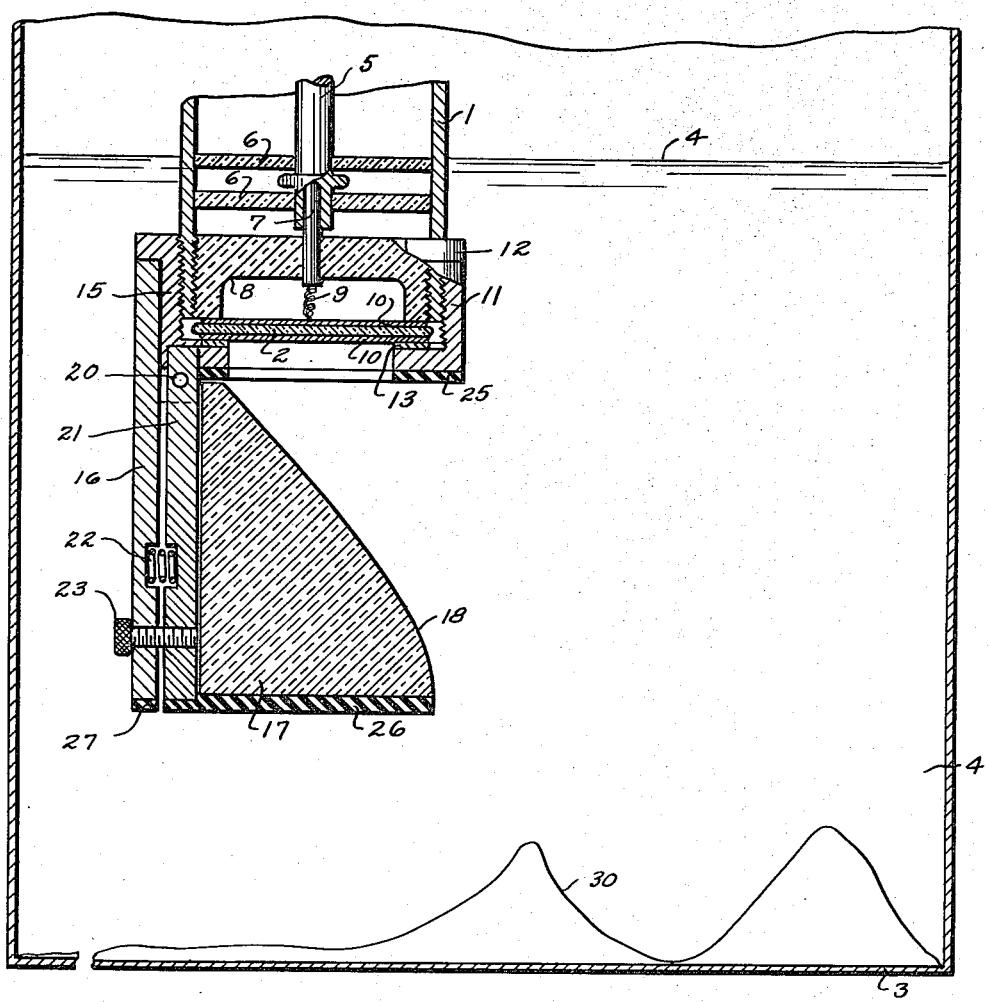
Fig. 1 is a fragmentary side elevational view partly in section of a radar simulating sound generator assembly that embodies the invention and that is suspended upon a trolley to be movably immersed in a tank of water.
Figure 3:
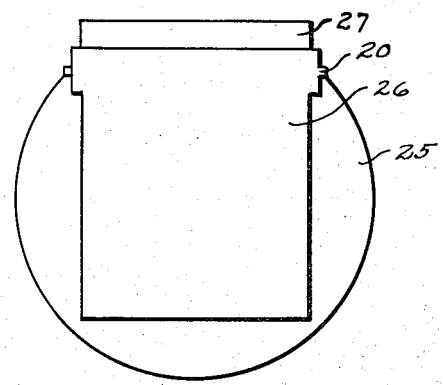
Fig. 3 is a plan view from below of the device shown in Figs. 1 and 2.

An illustrative apparatus to which the present invention is applied is shown in the accompanying drawings and comprises a rotatable sound generator immersed in a tank of water.

The sound generator shown comprises a pipe 1 having a quartz crystal 2 mounted in its lower end in a plane normal to the axis of the pipe. The quartz crystal 2 is the nucleus of the supersonic system for simulating a radar picture in a supersonic trainer. The crystal 2 is disposed substantially parallel to the bottom of the tank 3. The tank 3 contains a sound transmitting fluid such as water 4. A central signal conducting rod 5 extends axially and centrally of the pipe 1 which serves as a shield electrode of a coaxial cable with the rod 5 as the central conductor. The conducting rod 5 is supported centrally of the pipe 1 by a plurality of polystyrene spacers 6. The rod 5 terminates at its lower end in a socket into which a pin 7 supported by an externally threaded polystyrene spacer 8 seats to make an electrical connection therewith. The polystyrene spacer 8 threads into the lower end of the pipe 1 as shown. The pin 7 carries a cat's whisker 9, the lower end of which contacts the upper face of the crystal 2. Both the upper and lower faces of the crystal 2 are splattered with metallic gold 10.

The crystal 2 is mounted upon the lower end of the pipe 1 by a centrally apertured metal cap 11 that threads thereupon. The cap 11 terminates upwardly in a preferably substantially flush flange 12 that is knurled or provided with wrench lands for turning it with respect to the pipe 1. A thin lead gasket 13 is interposed between the cap 11 and the gold spattered lower face of the crystal 2.

The assembly connections are made water tight by the use of paraffin or the like. The cap 11 has a flat ear 15 to which a prism reference plate 16 is secured by welding or the like so that it extends beyond the end of and substantially parallel with the axis of the pipe 11. The flat ear 15 is apertured for a pin 20 upon which the upper end of a prism carrying plate 21 is movably mounted. Plate 21 is secured to a flat side of the prism 17 with water impervious cement. A spring 22 is interposed between the plate 16 and the plate 21 under compression against the adjustable action of a screw 23 that has a knurled head and that is used for setting the prism face 18 with respect to signals radiated from the crystal 2 into the water 4.

The altitude ring suppressing embodiment of the present invention comprises a resilient covering of rubber, cork, resilient plastic or the like cemented or otherwise secured to overlie horizontally disposed surfaces exposed to the water 4. As shown, the horizontally disposed lower face of the cap 11 has a ring 25 of rubber or the like cemented thereto. A plate 26 of a like material is cemented to and overlies the lower and horizontally disposed face of the prism 17 and of the lower edge of the prism carrying plate 21. A strip 27 of corresponding material is positioned to overlie the lower edge of the prism reference plate 16.

With this assemblage, a large part of or all of the horizontally disposed surfaces, other than the crystal 2, that are exposed to signals conducted by the water 4 are protected from vertical force distribution components that set up altitude rings in the radar set presentations.

The sound absorbent ring 25, plate 26 and strip 27 are attached and secured to the cap 11, prism 17 and plate 21, and to the reference plate 16 respectively with water insoluble cement. Preferably all horizontally disposed surfaces against which sound waves having a vertically directed force component would strike are cushioned in the described manner in order to effectively remove objectionable altitude rings from the radar signal presentations at the reproducer of the radar set. Toward this end the wrench land bearing or knurled flange 12 on the cap 11 for use in turning the cap 11 on the pipe 1, preferably bears cushioning material on its lower side if it projects radially outwardly from the cap 11, although preferably it is provided with a knurled peripheral surface that is flush with the remainder of the cap 11.

The entire pipe assembly is adapted for rotation in synchronism with the rotation of the radar antenna with which the presently disclosed equipment is used for test purposes.

In the derivation of the reflecting face 18 of the prism 17, as indicated in Fig. 4 of the accompanying drawings, alpha is defined as the angle at which sound intensity is incident to the horizontal plane of the relief map or to any point terminate in the horizontal plane. The angle alpha may be measured from a reference point beyond the axis. The vertical leg of the angle alpha is measured along the Y axis and the horizontal leg along the X axis. The angle alpha is a variable depending upon the point on the curve of the prism face 18 at which a tangent is drawn thereto.

A wave emanating from the crystal 2 strikes the curve of the prism face 18. Sound energy emanating from the crystal is considered as a collimated source due to its changed wave length. This energy, as it hits the reflector or prism face 18, breaks up into an infinite number of sound sources distributed over the face of the reflecting prism face 18. Each infinitesimally small point on this reflector is considered as an original source of energy. The curvature of the reflecting prism face 18 is such that these infinitesimally small units of energy are sent out to an infinite number of targets distributed along the horizontal plane of the map 30 so as to affect an even distribution of energy over the map for any given range which has been predetermined in the design of the prism face 18. The target from which these infinitesimally small units of energy are reflected is determined by a tangent to the curve at that particular point of reflection. The slope of the curve is $$-\frac{dy}{dx}$$

Beta is the angle of sound intensity indicated on the drawing by the symbol Jo, which is assumed to be equal to the angle of reflection from the curve of the reflection face 18 of the prism 17. The curve of the prism face 18 is derived in the following manner: Two beta=180−(90+alpha) which=90−alpha, from which beta is equal to $$45° - \frac{\text{alpha}}{2}$$

From which 90−beta is equal to $$45 + \frac{\text{alpha}}{2}$$

Hence the equation for the curve of the reflecting face 18 of the prism 17 is:

$$-\frac{dy}{dx} = \tan(90° - \text{beta}) = \tan\left(45° + \frac{\text{alpha}}{2}\right)$$

The curve so determined has been found experimentally to provide satisfactory signal performance.

Because of the rapidity with which signal is applied to the quartz crystal 2 it is not known technically whether the quartz crystal vibrates in single waves of maximum amplitude at the center of the crystal or in a multiplicity of minute waves radiating from the center to the peripheral edge of the crystal, which in effect would appear as a sine wave. In any event, it is known that the described assembly functions to simulate with practical satisfaction the field operations of a radar set in the transmission and reception of signals when the curve of the prism face 18 is so derived. Error of the training system itself with respect to ground range is minimized by starting the top portion of the reflector curve of the prism face 18 as close to the crystal 2 as is possible, taking into consideration the construction of the crystal holder or cap 11 and the support for the prism 17.

From a production standpoint it is necessary that the prism 17 be adjustably mounted with respect to the crystal 2. In production the Y axis of the prism 17 may be variable about a pivot at the top thereof in order that limitations in mechanical production of the device may be satisfactorily overcome. Theoretically, the prism 17 could be permanently mounted with respect to the crystal 2, assuming perfect orientation with respect to each other. Practically, this ideal is not readily obtainable and hence the prism 17 preferably is adjustably mounted with respect to the crystal 2 so that its range distribution may be properly centered. With respect to the distribution to sound energy in water the sound waves are assumed to travel vertically between the face of the crystal 2 and the prism face 18.

In using the trainer a 15 megacycle pulse of one microsecond duration is transmitted to the crystal 2 under water through a matching circuit, not shown. Energy is directed in a vertical plane from the crystal 2 to the glass reflector prism face 18 mounted directly beneath it. The curvature of the signal reflecting prism face 18 varies in such a manner as to simulate the cosecant squared distribution pattern of the basic radar equipment. As previously stated, it is assumed that the sound energy is reflected by the prism face 18 in such a manner that the angle of incidence is equal to the angle of reflection. The emitted signal after being reflected by the prism face 18 is transmitted to the map 30 built in relief and mounted on the bottom of the tank 3 under water. Reflected sound energy is transmitted by the water 4 to the reflector prism face 18 where it is reflected to the crystal 2. Again the signal incident angle is assumed to be equal to the reflected angle retransmitted to the quartz crystal 2. The quartz crystal 2 is vibrated mechanically by the returned echo signal so received, thereby setting up an electrical signal in the cat's whisker 9 proportional to the intensity of the echo signal return and from there it is passed to the radar equipment.

The radar training set with which the present device is used has been developed as an advanced operational radar trainer for radar operators of the PPI indicating type of radar equipment and presentation. It is used for the instruction of students in radar and more particularly the interpretation of radar signals in navigation bombing and iconoscope interpretation wherein practice is needed in reading presentations upon a cathode ray tube. Patent No. 2,405,591, issued August 13, 1946, to Warren P. Mason, for Training device, discloses a related equipment.

The pipe 1 which contains the crystal 2 is a mechanical means of immersing the crystal 2 in the water 4, so that it may be rotated in synchronism with the radar antenna. The reflecting prism face 18 may be adjusted to increase or decrease the over-all signal range distribution by means of the set screw 23 which is mounted at the lower end of the reflector assembly. The whole assembly including crystal 2 and reflecting prism 17 is mounted upon a bridge assembly or trolley mechanism not shown, so that it may be varied in altitude above the map 30 by operation of the mechanism to which the central pipe is mounted. This mechanism is suspended above the tank of water on a bridge assembly that is generally referred to as a trolley mechanism.

Operatively the radar equipment, not shown, which is basic to the system develops a pulse of one microsecond duration which is used as a basic synchronizing signal, as previously inferred. This signal is passed through a coaxial cable to a 15 megacycle signal generator. A one microsecond 15 megacycle pulse is developed within this signal generator and passed through a matching circuit to a coaxial cable which matches the signal to a matching circuit mounted on the trolley mechanism. From there this signal is transmitted down the center conductor 5 of the pipe 1 to the crystal 2 through the pin 7 and the cat's whisker 9. This electrical energy is transferred into mechanical vibration due to the piezoelectric quartz crystal 2 which develops a small wave length sound wave which travels in a straight direction. This sound wave is directed downward to the glass reflector prism face 18 from whence the signal is reflected through the water 4 in the tank 3 to the profile map 30 from which it is returned as an echo signal to the prism face 18.

The reflected signal is distributed from a range directly below the crystal 2 to a maximum range equivalent to 50 miles in an illustrative trainer. The curvature of the crystal face 18 is continuously varying in such a manner as to accomplish this result. The curvature directs the reflected energy so that the incident ray of sound energy is reflected at the same angle to which it contacts the reflector curve. After the energy has been reflected from the reflector face 18 it is transmitted through the water 4 to the relief map 30 from which the energy is reflected back along the same course to the same point on the reflector face 18 from which it started.

This energy is then reflected directly upward to the quartz crystal 2. The resultant mechanical vibration of the crystal 2 develops an electrical voltage proportional to the amount of energy returned. This signal is then transmitted back along the coaxial cable conductor 5 through the matching network to a high frequency amplifier and thence to the radar circuitry for presentation in a usual manner, where it is identified as an echo signal resulting from the previously transmitted signal.

The bridge assembly or trolley mechanism that has been referred to hereinabove is a device by means of which the pipe and the reflecting assembly carried at the lower end of the pipe may be moved frequently in lateral direction over the relief map 30 exposed upon the bottom of the water tank 3. The scale of the map is at a ratio between sound waves and the speed of light or radio waves. A transmitted signal of one microsecond duration may result in an echo that is returned to the piezoelectrical crystal 50 microseconds after the application of the transmitted signal to the same crystal 2. This delay is adequate to minimize or eliminate the interference between the transmitted signal and the echo signal when the presently disclosed equipment is used. The signal attenuation is in the order 67 decibels permitted in signal transmission through water.

The ground training apparatus modified as indicated herein provides presentations to the students that more nearly approach the actual radar signal and echo presentations observed in radar operations in the field than has been possible with any comparable piece of equipment known heretofore. The presentations from equipment that embodies the present invention are of improved precision and reality, due to the prism face 18 that is disclosed herein, and that are substantially free from altitude ring interference due to the absorption of vertically directed sound waves by the rubber cushioning pads that form parts of the present invention and that also are disclosed herein.

It is to be understood that the form of the invention that is shown and described herein has been submitted as being illustrative of a successfully operating embodiment of the invention and may be modified within limits within the scope of the present invention.

What I claim is:

1. A prism for use in reflecting sound in radar training equipment and having a reflecting face of curvature defined by the equation $$-\frac{dy}{dx} = \tan 45° + \frac{\text{alpha}}{2} = \tan(90° - \text{beta})$$

where alpha is the angle at which sound intensity is incident to any point terminate in a horizontal plane and beta is the angle of reflection of sound incident to the reflection face of the prism.

2. In an operator training radio detection and ranging system equipment wherein electrical radio signal is converted into mechanical vibration signal for conduction through a fluid medium and back into an electrical signal, comprising a hollow pipe adapted for making ground contact with the fluid, a gold splattered quartz crystal closing the lower end of said pipe against the entrance of fluid thereinto and having a gold splattered face insulated from said pipe, a central rod within said pipe and electrically insulated therefrom, a central rod contact engaging the gold splattered face of said quartz crystal insulated from the said pipe, and a mechanical vibration signal reflecting curved prism face of adjustable angularity with respect to the axis of said pipe and secured thereto in suspension from the sealed crystal carrying end thereof.

3. In an operator training radio detection and ranging system equipment whereby electrical radio signal is converted into mechanical vibration signal for conduction through a fluid then back into electrical signal, comprising a hollow pipe, and electrically conductive rod extending within and axially substantially centrally of said pipe, insulating means maintaining said rod substantially centrally of said pipe, a pin mounted at an end of said rod and continuing axially thereof, a cat's whisker carried by the unattached end of said pin, an insulating spacer threading into an end of said pipe and supporting the unattached end of said pin, an apertured flanged cap threading upon the end of said pipe within which the insulating spacer is threaded, a quartz crystal that is gold splattered on both faces and that is clamped between said insulating spacer and the flange on said apertured cap to engage the end of said cat's whisker not attached to said pin, gasket means maintaining a fluid tight seal between said quartz plate and the flange on said apertured cap, a fluid conductor mechanical vibration dampening rubber ring secured to the flange on said apertured cap remote from its engagement from said gasket means and substantially parallel to said quartz crystal, a prism reference plate mounted rigidly to depend from said apertured cap, a prism carrying plate hingedly mounted with respect to said prism reference plate, spring means urging said prism carrying plate away from said prism reference plate, an adjustable set screw rotatably mounted in said prism reference plate and said prism carrying plate for causing the hinged adjustable separation thereof against the yielding resistance of said spring, prism means mounted on to move with said prism carrying plate and having a fluid conducted mechanical vibration reflecting face disposed normally in angular relation with respect to said quartz plate, a fluid conducting mechanical vibration dampening rubber pad attached to said prism remote from and substantially parallel to said quartz crystal, and a fluid conducted mechanical vibration dampening rubber strip on the edge of said prism reference plate remote from its attached end and substantially parallel to said quartz crystal.

WILLIAM H. BAKER.

REFERENCES CITED

The following references are of record in the file of this patent:

UNITED STATES PATENTS

| Number | Name | Date |
|---|---|---|
| 2,405,591 | Mason | Aug. 13, 1946 |